(12) United States Patent
Oikawa (10) Patent No.: US 10,177,687 B2
(45) Date of Patent: Jan. 8, 2019

(54) OSCILLATORY WAVE MOTOR (71) Applicant: CANON KABUSHIKI KAISHA, Tokyo (JP)

(72) Inventor: Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 15/165,167

(22) Filed: May 26, 2016

(65) Prior Publication Data

US 2016/0352257 A1 Dec. 1, 2016

(30) Foreign Application Priority Data

May 29, 2015 (JP) .................................. 2015-110427

(51) Int. Cl.
*H02N 2/04* (2006.01)
*H01L 41/09* (2006.01)
*H02N 2/02* (2006.01)
*H02N 2/00* (2006.01)

(52) U.S. Cl.
CPC ........... *H02N 2/026* (2013.01); *H02N 2/0065* (2013.01)

(58) Field of Classification Search
CPC .............................. H02N 2/026; H02N 2/0065
USPC ................................. 319/323.01–323.21, 328
See application file for complete search history.

(56) References Cited

U.S. PATENT DOCUMENTS

2008/0061654 A1* 3/2008 Matsuo ............... H01L 41/0986
310/323.01

FOREIGN PATENT DOCUMENTS

JP 2011-234608 A 11/2011

* cited by examiner

*Primary Examiner* — Thomas Dougherty
(74) *Attorney, Agent, or Firm* — Cowan, Liebowitz & Latman, P.C.

(57) ABSTRACT

An oscillatory wave motor includes a piezoelectric element, an elastic member that includes a projecting portion, a friction member that moves relative to the elastic member and includes a contact surface in contact with the projecting portion, and pressing unit that brings the projecting portion into contact under pressure with the contact surface in a pressing direction that is a direction of a perpendicular line of the contact surface. The projecting portion includes a spherical portion formed in a center of the projecting portion, a contact portion formed on or near a center of the spherical portion, a flat portion formed around the spherical portion, and a corner portion formed around the flat portion. The spherical portion, the flat portion and the corner portion are configured to have a uniform thickness and to have flexibility in the pressing direction with the contact portion as a center.

6 Claims, 7 Drawing Sheets

OSCILLATORY WAVE MOTOR

BACKGROUND OF THE INVENTION

Field of the Invention

The present invention relates to an oscillatory wave motor that drives a friction member by causing a vibrator that is pressed to generate elliptical movement.

Description of the Related Art

Oscillatory wave motors are configured in such a manner that a contact portion where a flexible member is fixed and a friction member are in a pressed contact state. When under the pressed contact state, a two-phase voltage is applied to the piezoelectric element and a two-phase vibration is generated, elliptical vibration is generated at the contact portion of the elastic member and the friction member is displaced relative to the elastic member. To follow the elliptical vibration stably, a predetermined amount of flexibility is needed between the contact portion and the friction member. Japanese Patent Application Laid-Open No. 2011-234608 discloses an oscillatory wave motor configured to include a thin connecting portion having a flexibility around the contact portion which is thick.

However, the oscillatory wave motor disclosed in Japanese Patent Application Laid-Open No. 2011-234608 is significantly influenced by variation during manufacturing of the elastic member so that there is possibility that stable motor performance may not be obtained.

In the oscillatory wave motor disclosed in Japanese Patent Application Laid-Open No. 2011-234608, flexibility is imparted by only deformation of the connecting portion which is thin and provided around the contact portion. Since only the connecting portion having the thin thickness is locally deformed, the connecting portion has high sensitiveness to change in flexibility with respect to change in dimension.

Therefore, depending on dimensional variation of the connecting portion, there is possibility that the flexibility may be changed significantly and stable motor performance cannot be obtained.

SUMMARY OF THE INVENTION

The invention is made to solve the above-mentioned problem and an object of the invention is to provide an oscillatory motor that is difficult to be influenced by the manufacturing variation and is stable in motor performance.

To achieve the above-mentioned object, an oscillatory wave motor of the invention includes:
a piezoelectric element;
an elastic member that includes a projecting portion;
a friction member that moves relative to the elastic member and includes a contact surface in contact with the projecting portion; and
pressing unit that brings the projecting portion into contact under pressure with the contact surface in a pressing direction that is a direction of a perpendicular line of the contact surface,
wherein the piezoelectric element and the elastic member are fixed and caused to vibrate by application of an AC voltage to the piezoelectric element,
wherein the projecting portion includes:
a spherical portion formed in a center of the projecting portion on a side opposed to the friction member;
a contact portion that is in contact with the contact surface and formed on or near a center of the spherical portion;
a flat portion formed around the spherical portion; and
a corner portion formed around the flat portion,
wherein the spherical portion, the flat portion and the corner portion are configured to have a uniform thickness,
wherein the spherical portion, the flat portion and the corner portion have flexibility in the pressing direction with the contact portion as a center.

According to the invention, there can be provided an oscillatory wave motor that is less subject to variation upon manufacturing to provide stable motor performance.

Further features of the present invention will become apparent from the following description of exemplary embodiments with reference to the attached drawings.

DESCRIPTION OF THE EMBODIMENTS

Embodiment

Basic embodiments to which the present invention is applied will be specifically described with reference to the accompanying drawings. In the drawings, the same components are denoted by the same reference numerals. It is needless to say that the following embodiments will be exemplary explained and the invention is not limited thereto.

Although an oscillatory wave motor of the embodiment is explained with an example of a linear driving type of motor that is unitized as a driving actuator for a lens mirror barrel of digital camera and so on, use is not limited thereto.

Figure 1:
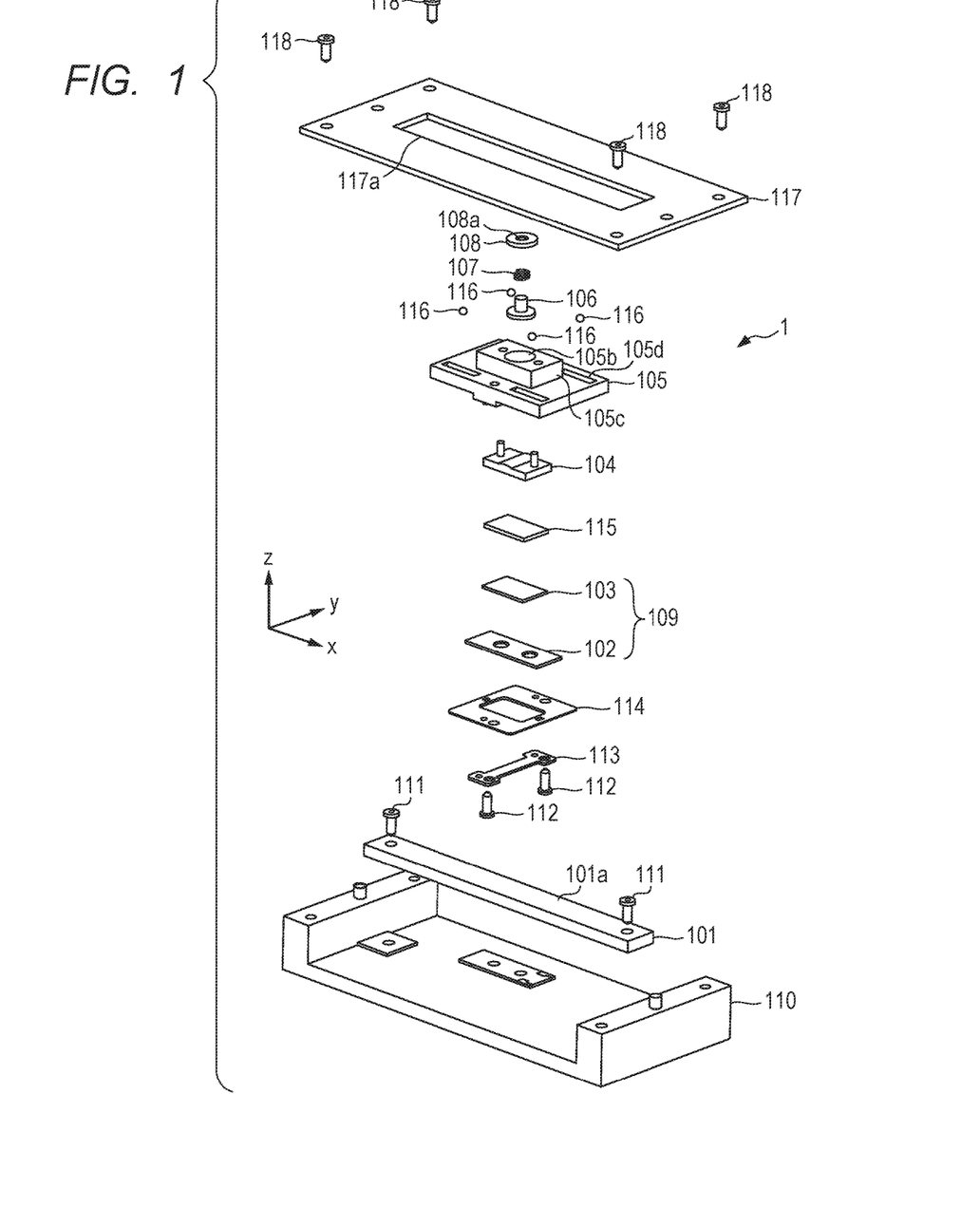
FIG. 1 is an exploded perspective view illustrating an oscillatory wave motor of the invention.

FIG. 1 is an exploded perspective view illustrating an oscillatory wave motor 1 according to an embodiment of the invention. It is noted that the same components are denoted by the same reference numerals in the drawings.

In the specification, a direction in which a vibrator 109 to be described is moved by elliptical vibration (elliptical motion) occurring to the vibrator 109 is defined as an X direction. Further, a pressing direction by a spring member 107 to be described below is defined as a Z direction. A direction in which the vibrator 109 is away from a friction member 101 to be described below in the Z direction is defined as a +Z direction and a direction in which the vibrator 109 is close to the friction member 101 in the Z direction is defined as a −Z direction. Further, a direction perpendicular to each of the X direction and the Z direction is defined as a Y direction.

To a fixing base 110 that supports elements constituting the oscillatory wave motor 1, the friction member 101 is fixed with two fixing screws 111. The friction member 101 includes a contact surface 101a with which a vibrator 109 to be described below is in pressed contact.

An elastic member 102 contacts with the contact surface 101a in a contact state with pressure. Further, the piezoelectric element 103 is adhered under pressure to the elastic member 102 with glue or the like. Further, in a state where the piezoelectric element 103 is adhered under pressure to the elastic member 102, a voltage is applied to the piezoelectric element 103 to generate vibration and cause the elastic member 102 to generate elliptical vibration. In the oscillatory wave motor 1 of the invention, the elastic member 102 and the piezoelectric element 103 constitute the vibrator 109. The friction member 101 is moved relative to the elastic member 102.

An interruption member 115 is provided between the piezoelectric element 103 and a small base 104 to be described below to interrupt in such a manner that vibration of the piezoelectric element 103 is prevented from being transmitted to other components. This configuration provides a function for preventing transmission of vibration to the small base 104 without attenuating the vibration generated by the piezoelectric element 103. Felt cloth fits for material of the interruption member 115. The small base 104 is in surface contact with the piezoelectric element 103 through the interruption member 115 to transmit to the piezoelectric element 103 pressing force by the spring member 107 to be described below.

The vibrator 109 and members around it are held by a holding member 105. Further, a pressing member 106 fits in a through hole portion 108a of a pressure receiving member 108 and is held to be movable in only a direction perpendicular to the contact surface 101a of the friction member 101. The pressing member 106 transmits pressing force from the spring member 107 to be described below to the vibrator 109 through the interruption member 115 and the small base 104 so as to bring the vibrator 109 into contact under pressure with the contact surface 101a of the friction member 101.

The spring member 107 that fits in the pressing member 106 is constituted by a compressing coil spring. One end portion of the spring member 107 is fixed by the pressure receiving member 108. The other end portion of the spring member 107 transmits pressing force to the pressing member 106 to generate the pressing force in a direction perpendicular to the contact surface 101a of the friction member 101. The Z direction illustrated in the drawings is a pressing direction by the spring member 107. The vibrator 109 and the friction member 101 are brought in pressed contact with each other by the pressing force of the spring member 107. The pressing member 106 and the spring member 107 constitute pressing unit of the invention.

The pressure receiving member 108 has a disk shape with a round hole at the center thereof and a thread portion formed at an outer circumferential side surface is threadedly fixed to a screw portion 105b of the holding member 105. Further, the pressing member 106 is fitted in and held by the through hole portion 108a that is the round hole opened at the center thereof.

The support member 114 provided below the elastic member 102 and the holding member 105 is formed in a thin plate shape and has lower rigidity in the Z direction than in the X direction. The support member 114 has a function such that the elastic member 102 is freely movable to the holding member 105 in the Z direction and is fixable in the X direction without looseness.

The support member 114 and the holding plate 113 are fixed to the holding member 105 with two fixing screws 112. Further, the holding plate 113 is positioned so as to form a predetermined amount of gap with the vibrator 109. Therefore, it is configured that when the vibrator 109 moves a predetermined amount or more in the −Z direction, the vibrator 109 is abutted to the holding plate 113 so as not to be movable beyond that amount. The holding plate 113 has a function to restrict the vibrator 109 not to move beyond the predetermined amount in the −Z direction.

Further, rolling balls 116 are interposed between groove portions 105d formed on the holding member 105 and grooves (not illustrated) formed on a ceiling plate 117 to be described below so that the holding member 105 is rollably supported with respect to the ceiling plate 117.

The ceiling plate 117 holds rollably the holding member 105 that holds the vibrator 109, by sandwiching the holding member 105 between the friction member 101 and the ceiling plate 117. The ceiling plate 117 is fixed to the fixing base 110 with four fixing screws 118.

The components explained above are unitized to constitute the oscillatory wave motor 1.

Figure 2A:
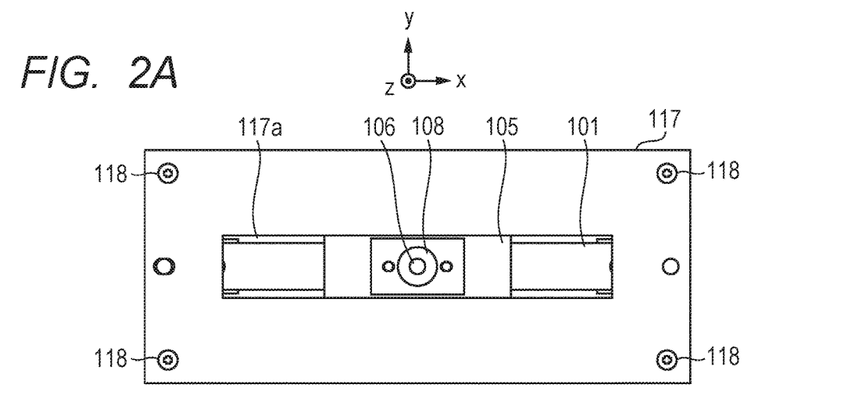
FIGS. 2A and 2B are views illustrating a state where each member illustrated in FIG. 1 is installed.
Figure 2B:
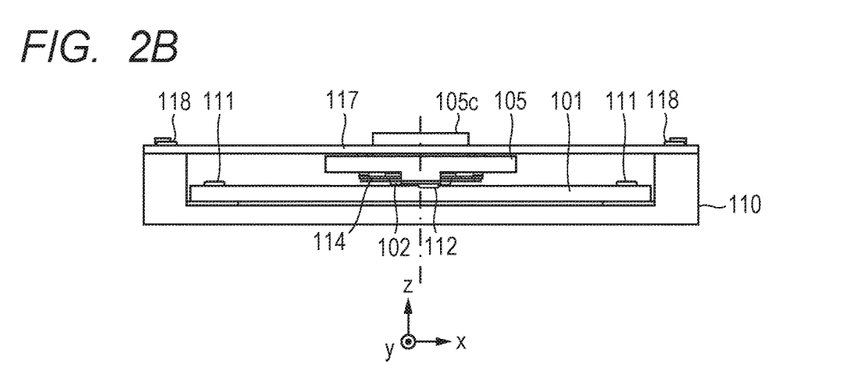

FIGS. 2A and 2B are views illustrating a state where each member illustrated in FIG. 1 is installed. FIG. 2A is a view viewed from the +Z direction and FIG. 2B is a view viewed from the −Y direction, the views illustrating a state where each member is installed. The friction member 101 is fixed to the fixing base 110 with two fixing screws 111. Further, the ceiling plate 117 is fixed to the fixing base 110 at the four corners thereof with four fixing screws 118. A rectangular opening 117a is provided at the center of the ceiling plate 117 so that a projecting portion 105c of the holding member 105 is exposed from the ceiling plate 117 upward in the Z direction.

The elastic member 102 is placed on the friction member 101 that is in an abutted state. The elastic member 102 is fixed to the holding member 105 through the support member 114 having a thin plate shape. Accordingly, the elastic member 102 is configured to be freely movable relative to the holding member 105 in the Z direction by deformation of the support member 114 but be positionable and fixable in the X direction.

If a relative movement is effected between the vibrator 109 and the friction member 101 in the X direction by elliptical vibration of the vibrator 109 generated by the power supply from an unillustrated power source, the fixing base 110, the friction member 101, the fixing screws 111, the ceiling plate 117 and the fixing screws 118 serve as a fixing portion. In contrast, the interruption member 115, the small base 104, the fixing screw 112, the holding plate 113, the support member 114, the pressing member 106, the spring member 107, the pressure receiving member 108 and further the holding member 105 that holds them, including the vibrator 109 serve as a movable portion. Namely, the oscillatory wave motor 1 of the invention is configured to be a self-propelled type of motor unit in which the vibrator 109 that is a driving source is itself movable. It is noted that upon installation in an actual lens mirror barrel or the like, the holding member 105 is connected with a focus mechanism or a zoom mechanism to drive them.

Figure 3:
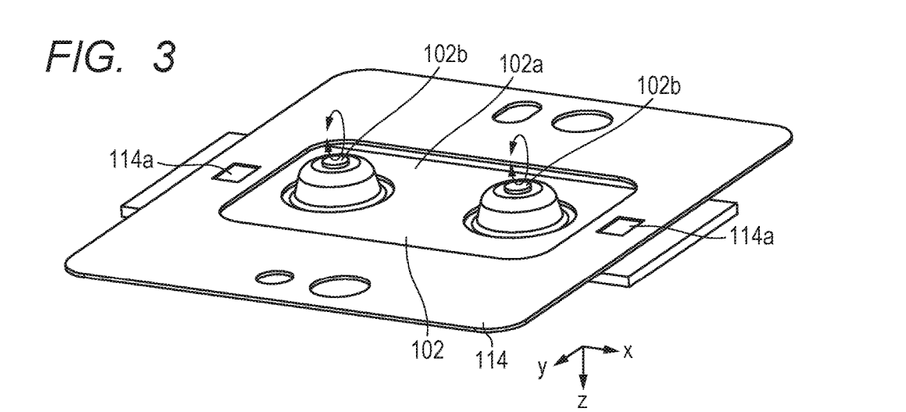
FIG. 3 is an enlarged perspective view illustrating a connecting state of a vibrator and a support member.

Next, constituting members of the oscillatory wave motor will be explained in detail. FIG. 3 is an enlarged perspective view viewed from a side of the friction member 101 and explaining a connecting state between the elastic member 102 and the support member 114 in FIGS. 1, 2A and 2B. In FIG. 3, two projecting portions are formed at the connecting portion 102a positioned in the center of the elastic member 102. A spherical portion 102b is formed at an upper end surface of each of the projecting portions. The spherical portion 102b is abutted to the contact surface 101a of the friction member 101. The two spherical portions 102b are formed on a same plane and are provided on the side opposed to the friction member 101, and the contact surface 101a is finished in an even surface by polishing during a manufacturing process to make a state abutted to the contact surface 101a of the friction member 101 satisfactory.

On the other hand, the piezoelectric element 103 is adhered under pressure to the back surface side (a surface side opposed to the surface on which the two projecting points is formed) of the connecting portion 102a illustrated in FIG. 3 by glue or the like. It is noted that a method of adhesion under pressure between the back surface of the connecting portion 102a and the piezoelectric element 103 is not limited as long as the adhesion under pressure can be obtained. The piezoelectric element 103 is formed in such a manner that a plurality of piezoelectric element films are laminated and integrated. Further, a predetermined AC voltage is applied to the piezoelectric element 103 that is laminated, to be vibrated and the elastic member 102 adhered under pressures to the piezoelectric element 103 is excited in two vibration modes. In this occasion, vibration phases of the two vibration modes are set to have a desired phase difference so that elliptical vibration is generated at the spherical portion 102b as illustrated by arrows in FIG. 3. The elliptical vibration is generated by the vibrator 109 illustrated in FIGS. 1, 2A and 2B and transmitted to the contact surface 101a of the friction member 101 so that the vibrator 109 itself can be linearly driven with respect to the friction member 101.

Next, a recessed portion 114a for joining with the elastic member 102 is formed at both sides that interpose two spherical portions 102b of the support member 114. The support member 114 is joined with the elastic member 102 at the recessed portions 114a by welding, adhesion or the like. However, the joining method is not limited as long as the support member 114 can be joined with the elastic member 102.

The elastic member 102 is fixed to the holding member 105 through the support member 114 having a thin plate shape. With this configuration, the elastic member 102 is freely movable with respect to the holding member 105 in the Z direction that is the pressing direction, but is fixed with respect to the holding member 105 in the X direction that is the driving direction with no positional displacement.

Figure 4A:
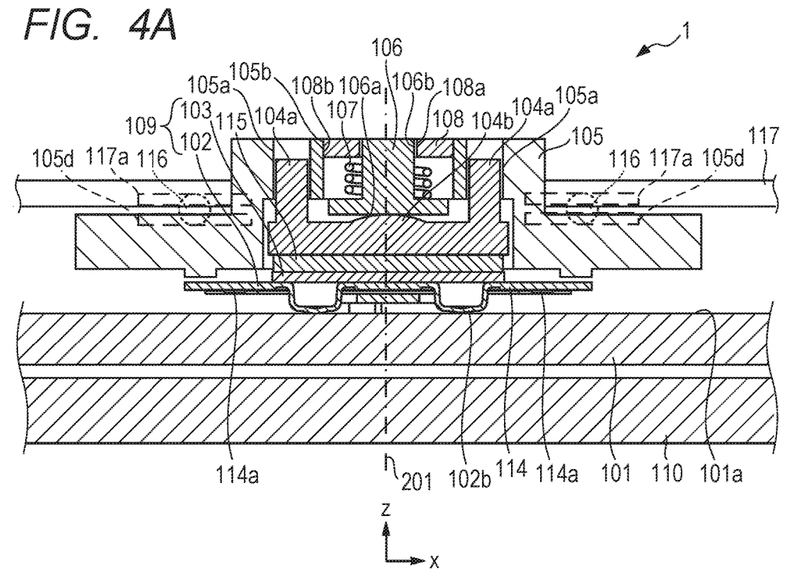
FIGS. 4A and 4B are enlarged cross-sectional views illustrating a state where each member is installed.
Figure 4B:
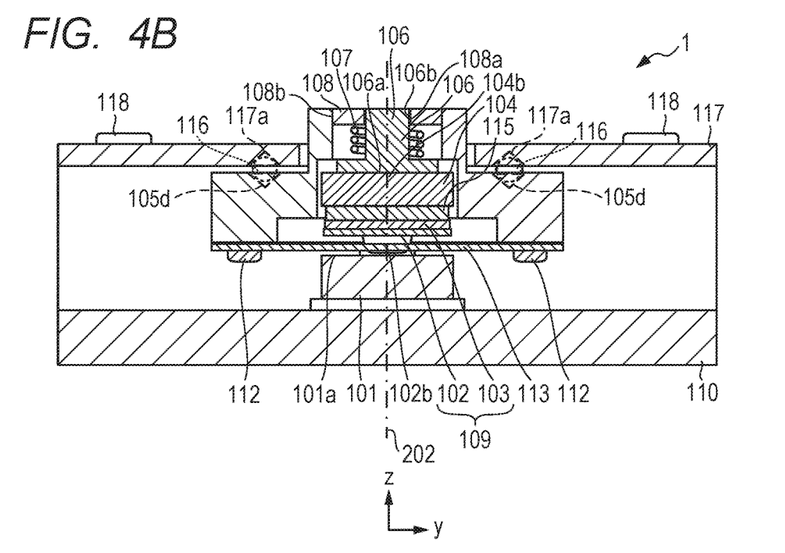

FIGS. 4A and 4B are enlarged cross-sectional views illustrating the oscillatory wave motor 1 in a state where each member is installed. FIG. 4A is a cross-sectional view taken along a plane perpendicular to the Y axis in FIGS. 2A and 2B, the plane passing a center of the pressing member 106. Further, FIG. 4B is a cross-sectional view taken along a plane perpendicular to the X axis in FIGS. 2A and 2B, the plane passing the center of the pressing member 106.

A center line 201 illustrated in FIG. 4A and a center line 202 illustrated in FIG. 4B pass a center of gravity of the spherical portions 102b that contact with the contact surface 101a of the elastic member 102, and include a normal line of the contact surface 101a.

The spherical portions 102b are abutted to the contact surface 101a of the friction member 101 and are in a pressed contact state. Further, the elastic portion 102 is in contact with the support member 114 at the both end portions thereof. And the piezoelectric element 103 is in surface contact with the small base 104 through the interruption member 115.

The holding member 105 is provided with two hole portions 105a, and two axis portions 104a with which the small base 104 is provided are fitted therein. Each of the two hole portions 105a with which the holding member 105 is provided is shaped in a long hole extending in the X direction and the small base 104 is tiltable in a predetermined range.

In the center of an upper side of the small base 104, an abutment portion 104b is provided. The abutment portion 104b has an arc shape in the cross-sectional view of FIG. 4A and is constituted partially by a cylinder extending in a depth direction of the drawing sheet (right and left direction in FIG. 4B). A lower end surface 106a of the pressing member 106 is in line contact with the abutment portion 104b. Since the lower end surface 106a is formed by a plane, a portion in line contact with the abutment portion 104b forms a line contact having a length in the depth direction of the drawing sheet of FIG. 4A (right and left direction in FIG. 4B). Accordingly, in the cross-sectional view of FIG. 4A, the small base 104 is configured to be tiltable. If dimension error upon manufacturing, error of assembly or inclination of a member due to external disturbance occurs, the small base 104 is tilted in such a manner the spherical portions 102b of the elastic member 102 follow the contact surface 101a of the friction member 101 so that the pressed contact state can be kept satisfactorily.

A thread portion 105b is formed in the holding member 105 and a thread portion 108b formed on an outer diameter side face of the pressure receiving member 108 is threadedly engaged therewith. An amount of the thread engagement is changed corresponding to component variation to adjust the pressing force. A fitting axis portion 106b of the pressing member 106 is fitted in and held by the through hole portion 108a formed in the center of the pressure receiving member 108 so that the pressing member 106 is configured to be movable in the Z direction only.

The ceiling member 105 is fixed to the fixing base 110 and has a function to receive counterforce when the spherical portion 102b of the elastic member 102 is in pressed contact with the contact surface 101a of the friction member 101 by spring force of the spring member 107. On that occasion, rolling balls 116 are sandwiched between groove portions (not illustrated) on a lower surface of the ceiling plate 117 and groove portions 105d formed on the holding member 105 so that the holding member 105 and the ceiling plate 117 are configured to be rollably supported. This configuration minimizes frictional resistance as little as possible upon movement in the X direction while receiving counterforce due to pressed contact in the Z direction. Further, the rolling balls are sandwiched by groove portions (not illustrated) of the ceiling plate 117 and the groove portions 105d of the holding member 105 so that positioning in the Y direction is configured to be determined. In the oscillatory wave motor 1 of the invention, the spring force of the spring member 107 is received by four rolling balls 116 so that the holding member 105 is rollably supported without tilting with respect to the ceiling plate 117.

Between the piezoelectric element 103 and the small base 104, the interruption member 115 is sandwiched. For the interruption member 115, material having a function to interrupt transmission of vibration without preventing the vibration is used so that transmission of vibration to the small base 104 is suppressed without preventing vibration generated by the piezoelectric element 103. As material suit for the interruption member 115, for example felt cloth or the like is cited.

To transmit the pressing force for bringing the spherical portions 102b into contact under pressure with the contact surface 101a of the friction member 101, the vibrator 109 needs to be movable freely in the Z direction. Further, to drive with a high precision the holding member 105 connected with a focus mechanism and a zoom mechanism, the vibrator 109 needs to be held by the holding member 105 without looseness. Accordingly, the vibrator 109 is fixed to the holding member 105 through the support member 114 formed in a thin plate shape. Accordingly, it is configured that movement can be freely made in the Z direction and driving can be made in the X direction without looseness.

Figure 5:
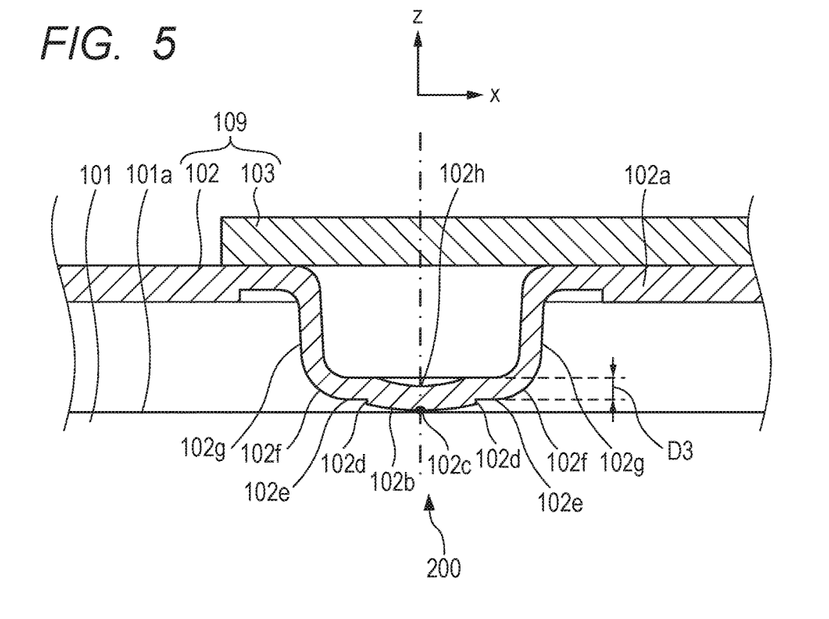
FIG. 5 is a cross-sectional partial view illustrating a vibrator.

FIG. 5 is a cross-sectional partial view taken along the XZ plane of the vibrator 109. FIG. 5 enlargedly illustrates the spherical portion 102b and its vicinity.

In FIG. 5, the piezoelectric element 103 and the elastic member 102 are fixed at the connecting portion 102a that is fixed to the piezoelectric element 103 to constitute the vibrator 109.

The elastic member 102 is provided with the projecting portion 200 that projects and faces the friction member 101. The projecting portion 200 includes the spherical portion 102b formed in the center on the side of the friction member 101 and a contact portion 102c abutted to the contact surface 101a of the friction member 101. The contact portion 102c is provided in or near the center of the spherical portion 102b. Further, the projecting portion 200 includes a flat portion 102e provided around the spherical portion 102b, a step portion 102d formed between the spherical portion 102b and the flat portion 102e. The flat portion 102e is formed to have a thickness D3. The projecting portion 200 further includes a corner portion 102f formed around the flat portion 102e and a side wall portion 102g formed to project to the side opposite to the piezoelectric element 103.

A space between two contact portions 102c significantly affects an amplitude of vibration generated at the contact portion 102c to influence on performance of the motor significantly. Accordingly, the space between the two contact portions 102c needs to be measured at high accuracy upon measurement and inspection. If the spherical portion 102b and the flat portion 102e are smoothly connected with each other without the step portion 102d extending therebetween, a boundary line is obscure so that measurement is so difficult. Accordingly, the step portion 102d is provided around the spherical portion 102b so that a region of the spherical portion 102b becomes visible from the -Z direction. With the configuration, when places of the spherical portion 102b and the contact portion 102c are measured, measurement can be made at high accuracy.

The side wall portion 102g is formed by a tapered surface that is a conical surface extending from the fixing surface of the piezoelectric element 103. The conical surface is formed to have a diameter that becomes smaller from the side of the piezoelectric element 103 to the side of the friction member 101. With the configuration, it can be achieved that a variation in thickness of the side wall portion 102g is reduced upon press processing and stable flexibility is provided with respect to force acting on the contact portion 102c in an oblique direction.

A spherical recessed portion 102h is formed on a surface on the +Z direction side of the spherical portion 102b. The spherical recessed portion 102h has a surface formed in a spherically recessed shape on the +Z direction side of the spherical portion 102b and a portion sandwiched between the spherical portion 102b and the spherical portion 102h is configured to have a uniform thickness. Each of the spherical portion 102b, the flat portion 102e and the corner portion 102f is configured to have a uniform (same) thickness.

As explained above, the contact portion 102c, the spherical portion 102b, the step portion 102d, the flat portion 102e, the corner portion 102f and the side wall portion 102g constitute the projecting portion 200.

Figure 6:
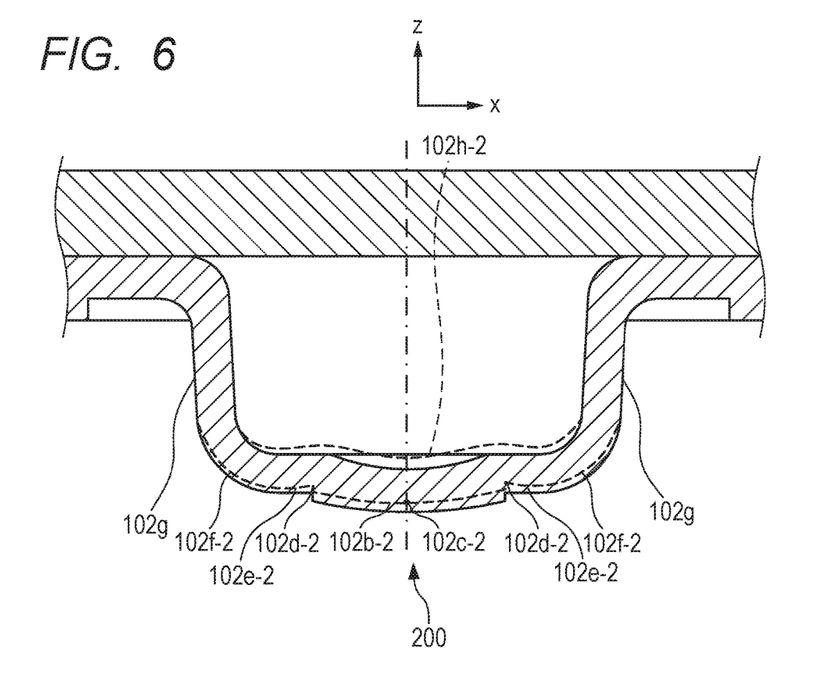
FIG. 6 is a cross-sectional partial view illustrating a state where a projecting portion 200 is deformed.

FIG. 6 is a cross-sectional partial view illustrating a state where the projecting portion 200 is deformed. FIG. 6, similarly to FIG. 5, is an enlarged cross-sectional partial view of the spherical portion 102b and its vicinity, illustrating the vibrator 109 taken along the XZ plane. In FIG. 6, a solid line illustrates a shape before deformation and a dotted line illustrates a shape that is deformed in the +Z direction. Contact and non-contact are repeated between the contact portion 102c and the contact surface 101a by vibration. With this configuration, the projecting portion 200 is deformed synchronously with vibration. The deformation of the projecting portion 200 is deformation in the pressing direction (Z direction) by the spring member 107 as illustrated in FIG. 6. In FIG. 6, a shape of the projecting portion 200 that is deformed in the +Z direction is illustrated to make the explanation easier to understand. However, actual deformation of the projecting portion 200 is repeated between deformation in the +Z direction and that in the -Z direction synchronously with vibration. Further, the shape before deformation drawn by the solid line in FIG. 6 is the same as that in FIG. 5 so that explanation is omitted.

The projecting portion 200 after deformation drawn by the dotted line in FIG. 6 is constituted by a contact portion 102c-2 in a state deformed in the +Z direction, a spherical portion 102b-2 in the state deformed in the +Z direction, a step portion 102d-2 in a state deformed in the +Z direction, a flat portion 102e-2 in a state deformed in the +Z direction and a corner portion 102f-2 in a state deformed in the +Z direction. The spherical recessed portion 102h becomes a spherical recessed portion 102h-2 in a state deformed in the +Z direction. As illustrated in FIG. 6, each of the spherical portion 102b-2, the flat portion 102e-2 and the corner portion 102f-2 is configured to deform little by little so that deformation is configured to be made as a whole. This configuration prevents only a partial portion from deforming locally to a large extent. As explained above, flexibility in the Z direction is provided by deforming the spherical portion 102b-2, the flat portion 102e-2 and the corner portion 102f-2 little by little with the contact portion 102c-2 as a center.

In the conventional oscillatory wave motor as disclosed in Japanese Patent Application Laid-Open No. 2011-234608, flexibility is provided by only local deformation of connecting portion having the thin thickness provided around the contact portion. In a case of the local deformation, if rigidity of deformation occurring portion is changed due to manufacturing variation or the like, the change in flexibility is remarkably great. Namely, there has been a problem that sensitiveness to change in flexibility due to the manufacturing variation becomes high significantly.

However, in a case of entire deformation in which each portion is deformed little by little as in the oscillatory motor of the invention, sensitiveness to change in flexibility due to manufacturing variation can be lowered. This configuration provides stable flexibility that is difficult to be influenced by the manufacturing variation.

As explained above, the spherical portion 102b-2, the flat portion 102e-2 and the corner portion 102f-2 deform with the contact portion 102c-2 as a center so that stable flexibility can be achieved in the pressing direction (Z direction) of the spring member 107.

Figure 7A:
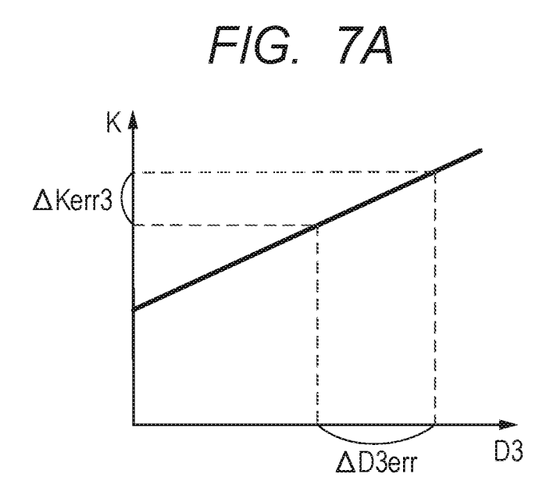
FIGS. 7A and 7B are graphs explaining a state where sensitiveness to change in flexibility due to manufacturing variation is reduced.
Figure 7B:
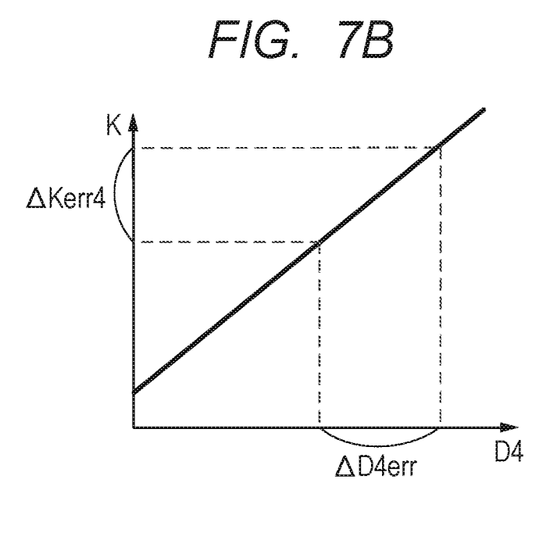

FIGS. 7A and 7B are graphs explaining a manner where sensitiveness to change in flexibility due to manufacturing variation is reduced. In connection with FIGS. 7A and 7B, an example in which the thickness D3 of the flat portion 102e is changed due to manufacturing variation will be explained. FIG. 7A is a view explaining change in flexibility when the thickness D3 of the flat portion 102e in the oscillatory wave motor of the invention is changed due to manufacturing variation. FIG. 7B is a view explaining change in flexibility when the thickness of the connecting portion having the thin thickness provided around the contact portion in the oscillatory wave motor disclosed in Japanese Patent Application Laid-Open No. 2011-234608 is changed due to manufacturing variation.

First, a manner of change in flexibility due to manufacturing variation in the conventional oscillatory wave motor will be explained using FIG. 7B. In Japanese Patent Application Laid-Open No. 2011-234608, since a portion corresponding to the flat portion 102e having the thickness D3 of the invention is the connecting portion having the thin thickness provided around the contact portion, change in flexibility due to change in thickness of the connecting portion having the thin thickness provided around the contact portion will be explained with reference to FIG. 7B. In FIG. 7B, an abscissa indicates the thickness D4 of the connecting portion having the thin thickness provided around the contact portion in Japanese Patent Application Laid-Open No. 2011-234608. An ordinate indicates a value of flexibility in the pressing direction (Z direction) in Japanese Patent Application Laid-Open No. 2011-234608; namely, a spring constant. A ΔD4err indicates a change amount of the thickness D4 of the thin thickness portion due to manufacturing variation and a ΔKerr4 indicates a change amount of the spring constant generated by change in thickness D4 of the thin thickness portion.

In the oscillatory wave motor disclosed in Japanese Patent Application Laid-Open No. 2011-234608, the connecting portion having the thin thickness provided around the contact portion provides flexibility in the pressing direction by great local deformation of the connecting portion having the thin thickness provided around the contact portion so that the change amount ΔKerr4 of the spring constant generated due to the change amount ΔD4err of the thickness of the thin thickness portion becomes extremely large. Namely, it is understood that the sensitiveness to the change in flexibility due to manufacturing variation becomes remarkably high.

Next, a manner of change in flexibility due to manufacturing variation in the oscillatory wave motor of the invention will be explained using FIG. 7A. In FIG. 7A, an abscissa indicates the thickness D3 of the flat portion 102e. An ordinate indicates a value of flexibility in the pressing direction (Z direction) by deformation of the spherical portion 102b, the flat portion 102e and the corner portion 102f with the contact portion 102c as a center; namely, a spring constant. A ΔD3err indicates a change amount of the thickness D3 of the flat portion due to manufacturing variation and a ΔKerr3 indicates a change amount of the spring constant generated by change in thickness D3 of the flat portion 102e.

In the oscillatory wave motor 1 of the invention, the spherical portion 102b, the flat portion 102e and the corner portion 102f deform little by little with the contact portion 102c as a center so that the change amount of the flat portion 102e is small. Accordingly, in a case where the change amount ΔD3err of the thickness D3 of the flat portion 102e and the change amount ΔD4err of the thickness D4 of the thin thickness portion are substantially the same, the change amount ΔKerr3 of the spring constant generated by the change amount ΔD3err of the thickness D3 of the flat portion 102e can be made small compared with the change amount ΔKerr4 of the conventional spring constant. Namely, the sensitiveness to the change in flexibility to the change amount ΔD3err of the thickness D3 of the flat portion 102e can be made low. This configuration can provide stable flexibility that is difficult to be influenced by manufacturing variation.

As explained above using FIGS. 7A and 7B, the oscillatory wave motor of the invention is configured to deform as a whole by deforming each portion little by little so that the sensitiveness to the change in flexibility due to manufacturing variation can be lowered. This configuration can provide stable flexibility that is difficult to be influenced by manufacturing variation.

Figure 8:
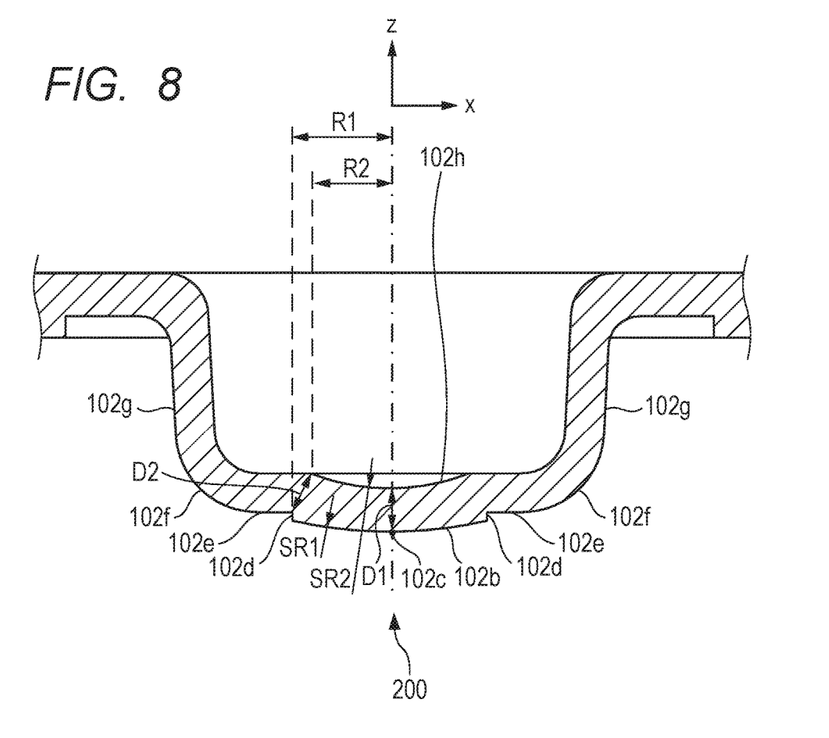
FIG. 8 is a cross-sectional partial view explaining a relation between a contact portion and a spherical recessed portion and a relation between a step portion and the spherical recessed portion.

FIG. 8 is a cross-sectional partial view explaining a relation between the contact portion 102c and the spherical recessed portion 102h and a relation between the step portion 102d and the spherical recessed portion 102h. FIG. 8 similarly to FIGS. 5 and 6, is an enlarged cross-sectional partial view of the spherical portion 102b, illustrating the vibrator 109 taken along the XZ plane. The explanation as to the same components as those of FIG. 5 is omitted in FIG. 8.

The spherical portion 102b has a spherical radius SR1 and the spherical recessed portion 102h has a spherical radius SR2. Further, a thickness D1 of the contact portion 102c of the spherical portion 102b and the spherical recessed portion 102h, the spherical radius SR1 and the spherical radius SR2 are configured to satisfy the following equation.

$$SR1 > SR2 + D1 \quad (1)$$

If the spherical portion 102b and the spherical recessed portion 102h constitute a uniform thickness through the entire region, the thickness D2 near the step portion 102d is made thin locally by an amount of step difference. Then, there is possibility that material is prevented from moving between the spherical portion 102b and the flat portion 102e upon press processing so that processing accuracy of the projecting portion 200 is lowered. Therefore, the oscillatory wave motor of the invention is configured to satisfy the relation of the equation (1) so that the thickness between the spherical portion 102b and the spherical recessed portion 102h is the thinnest at the contact portion 102c and becomes thicker little by little as a portion is away from the contact portion 102c.

The thickness between the spherical portion 102b and the spherical recessed portion 102h is configured to be uniform but the spherical radius SR1 and the spherical radius SR2 satisfy the equation (1) so that a thin thickness portion is prevented from being generated locally at or near the step portion 102d. This configuration prevents the processing accuracy of the projecting portion 200 from becoming low.

In FIG. 8, the radius R1 with the contact portion 102c of the step portion 102d as a center and the radius R2 with the contact portion 102c as a center at a position where the spherical recessed portion 102h and the flat portion 102e cross each other are configured to satisfy the following equation (2).

$$R2 < R1 \quad (2)$$

If the radius R2 is larger than the radius R1, the step portion 102d and the spherical recessed portion 102h are close to each other and a portion having a thin thickness is locally generated. Then, it is possible that material is prevented from moving between the spherical portion 102b and the flat portion 102e upon press processing so that pressing accuracy of the projecting portion 200 is lowered.

Accordingly, the oscillatory wave motor 1 of the invention is configured to satisfy the relation of the equation (2) so that the step portion 102d and the spherical recessed portion 102h are not close to each other. This configuration prevents a thin thickness portion from being generated locally due to closeness between the step portion 102d and the spherical recessed portion 102h. As a result, lowering of the processing accuracy of the projecting portion 200 is reduced.

As explained above, in the oscillatory wave motor 1 of the invention, the relation between the contact portion 102c and the spherical recessed portion 102h and the relation between the step portion 102d and the spherical recessed portion 102h are established as explained with reference to FIG. 8 so that lowering of processing accuracy of the projecting portion 200 can be reduced. Therefore, an oscillatory wave motor that is stable in motor performance and is difficult to be influenced by manufacturing variation can be achieved.

Figure 9:
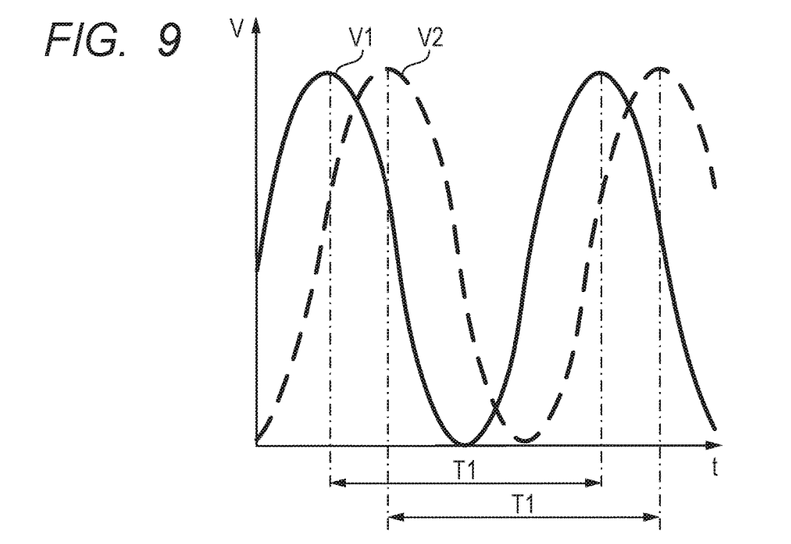
FIG. 9 is a graph explaining an AC voltage applied to a piezoelectric element.

FIG. 9 illustrates a graph explaining an AC voltage applied to the piezoelectric element 103. In FIG. 9, an abscissa indicates time and an ordinate indicates a voltage. A V1 and a V2 are a two-phase voltage applied to the piezoelectric element 103. In the oscillatory wave motor 1 of the invention, the AC voltage V1 and the AC voltage V2 each being the two-phase AC voltage having a phase angle of approximate 90 degrees are applied to the piezoelectric element 103. A T1 denotes a cycle of the AC voltage V1 and the AC voltage V2. The AC voltage V1 and the AC voltage V2 are the same in cycle T1 and shifted from each other by the phase angle of approximate 90 degrees. Here, a frequency frd of the AC voltage V1 and the AC voltage V2 is expressed as the following expression (3).

$$frd = 1/T1 \quad (3)$$

Figure 10:
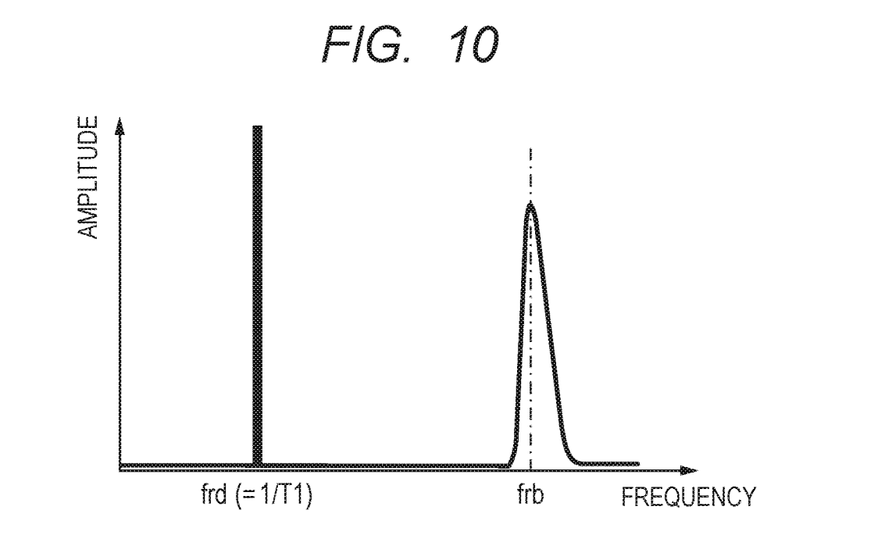
FIG. 10 is a graph illustrating a relation between a resonance frequency and a drive frequency of deformation of a projecting portion in a Z direction.

FIG. 10 is a graph illustrating a relation between a resonance frequency frb and a drive frequency frd of deformation of the projecting portion 200 in the Z direction. In FIG. 10, an abscissa indicates a frequency and an ordinate indicates an amplitude.

As explained with reference to FIG. 6, the projecting portion 200 is deformed by flexibility in the Z direction and in the Z direction synchronously with vibration. When a resonance frequency of a deformation mode is defined as frb, the projecting portion 200 exhibits frequency characteristics in which it is resonated at or around the resonance frequency frb and an amplitude of vibration becomes great sharply, and the amplitude of the vibration becomes small at a frequency away from the resonance frequency frb, as illustrated in FIG. 10.

The frequency frd is a frequency of an AC voltage to be applied to the piezoelectric element 103. By the AC voltage of the frequency frd, vibration of the vibrator 109 is excited. By this vibration, the contact portion 102c vibrates at the frequency frd in the X direction and the Z direction. To achieve stable contact between the contact portion 102c and the contact surface 101a, as explained with reference to FIG. 6, the projecting portion 200 needs to be deformed in the Z direction synchronously with the resonance frequency frb. Accordingly, in the oscillatory wave motor 1 of the invention, as illustrated in FIG. 10, the resonance frequency frb of deformation of the projecting portion 200 by flexibility in the Z direction is configured to be higher than the frequency frd of the AC voltage. If this relation is expressed by a numerical expression, the following equation (4) is established.

$$frd < frb \quad (4)$$

As explained above, the oscillatory wave motor 1 of the invention is configured in such a manner that the resonance frequency frb of deformation of the projecting portion 200 by flexibility in the Z direction is higher than the frequency frd of the AC voltage as expressed by the equation (4). With this configuration, stable contact between the contact portion 102c and the contact surface 101a is maintained and stable motor performance is achieved.

Figure 11:
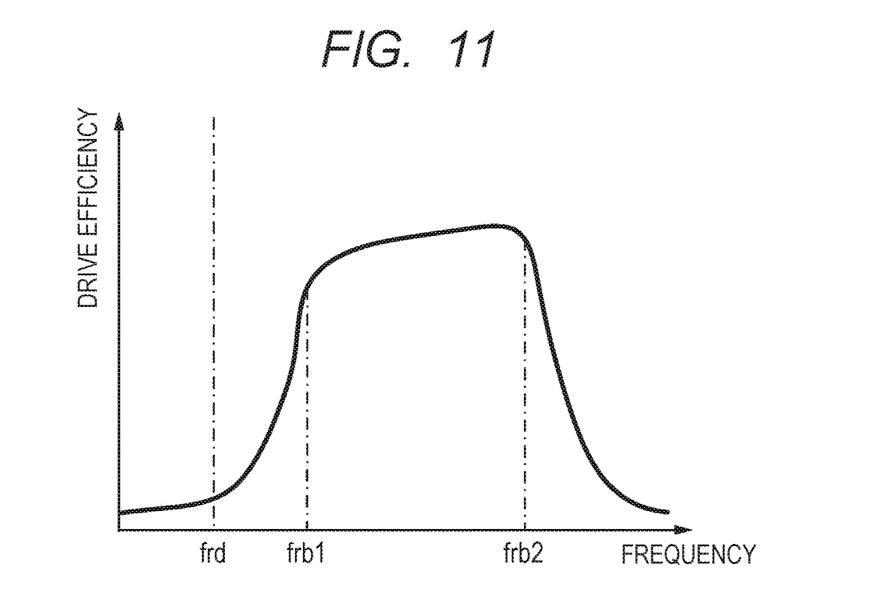
FIG. 11 is a graph illustrating a state where drive efficiency is changed by a resonance frequency of deformation of the projecting portion in the Z direction.

FIG. 11 illustrates a manner where drive efficiency is changed by a resonance frequency of deformation of the projecting portion 200 in the Z direction. In FIG. 11, an abscissa indicates a resonance frequency of deformation of the projecting portion 200 by flexibility in the Z direction and an ordinate indicates a drive efficacy of the oscillatory wave motor 1.

The frequency frd is a frequency of AC voltage to be applied to the piezoelectric element. The frb1 and frb2 are resonance frequencies of deformation of the projecting portion 200 by flexibility in the Z direction at change points where drive efficiency is changed sharply, and the frequency of change point at a low frequency side is denoted as the frb1 and the frequency of change point at a high frequency side is denoted as the frb2.

First, a reason why the efficiency is sharply changed at the frequency frb1 of the change point at the low frequency side will be explained. If the resonance frequency frb of deformation of the projecting portion 200 by flexibility in the Z direction is too low, the contact portion 102c fails to follow the vibration. Then, the drive efficiency is sharply deteriorated. Normally, if the resonance frequency frb of deformation of the projecting portion 200 by flexibility in the Z direction becomes lower than the twice of the frequency of the AC voltage applied to the piezoelectric element 103, the contact portion 102c fails to follow vibration so that the drive efficiency is sharply deteriorated. Accordingly, the frequency frb1 of the change point at the low frequency side is preferably made the twice of the frequency of the AC voltage applied to the piezoelectric element 103.

Next, a reason why the efficiency is sharply changed at the frequency frb2 of the change point at the high frequency side will be explained. If the resonance frequency frb of deformation of the projecting portion 200 by flexibility in the Z direction is too high, or namely, the rigidity of the projecting portion 200 is too high, the projecting portion 200 fails to follow vibration. Then, a time period for frictional contact between the contact portion 102c and the contact surface 101a is made too short so that the drive efficiency is sharply deteriorated. Normally, if the resonance frequency frb of deformation of the projecting portion 200 by flexibility in the Z direction becomes higher than six times of the frequency of the AC voltage applied to the piezoelectric element 103, the contact portion 102c no longer deforms so that the drive efficiency is sharply deteriorated. Accordingly, the frequency frb2 of the change point at the high frequency side is preferably made the six times of the frequency of the AC voltage applied to the piezoelectric element 103. Summarizing the above, it is preferable to set the resonance frequency of the deformation of the projecting portion 200 by flexibility to twice or grater to six times or less of the frequency of the AC voltage.

In the oscillatory wave motor 1 of the invention, the relation between the frequency frd of the AC voltage applied to the piezoelectric element 103 and the resonance frequency frb of deformation of the projecting portion 200 by flexibility in the Z direction establishes the relation as explained using FIGS. 9, 10 and 11. With this relation, stable contact between the contact portion 102c and the contact surface 101a can be maintained and the oscillatory wave motor 1 stable in motor performance can be achieved.

As explained above with reference to FIGS. 1 to 11, the contact portion 102c, the spherical portion 102b, the step portion 102d, the flat portion 102e, the corner port 102f and the side wall portion 102g constitute the projecting portion 200 of the elastic member 102. The spherical portion 102b, the flat portion 102e and the corner portion 102f are configured to have a uniform thickness and the spherical portion 102b, the flat portion 102e and the corner portion 102f deform with the contact portion 102c as the center so that the stable flexibility to the pressing by the spring member 107 can be achieved. The spherical portion 102b, the flat portion 102e and the corner portion 102f deform little by little as a whole so that local deformation to a great extent is prevented. Since no great deformation occurs locally, the sensitiveness to change in flexibility due to manufacturing variation becomes low so that stable flexibility can be achieved. With this configuration, an oscillatory wave motor stable in motor performance can be achieved.

While, preferred embodiments of the invention have been explained as above, the invention is not restricted to the above-mentioned embodiments, and various modifications and changes can be made within scope of the invention. Further, for example, an ultrasonic wave motor which causes a piezoelectric element and an elastic member to generate ultrasonic vibration may be used as an oscillatory wave motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110427, filed May 29, 2015, which is hereby incorporated by reference herein in its entirety.

What is claimed is:

1. An oscillatory wave motor comprising:
   a piezoelectric element;
   an elastic member that includes a projecting portion;
   a friction member that moves relative to the elastic member and includes a contact surface in contact with the projecting portion; and
   pressing unit that brings the projecting portion into contact under pressure with the contact surface in a pressing direction that is a direction of a perpendicular line of the contact surface,
   wherein the piezoelectric element and the elastic member are fixed and caused to vibrate by application of an AC voltage to the piezoelectric element,
   wherein the projecting portion includes:
      a spherical portion formed in a center of the projecting portion on a side opposed to the friction member;
      a contact portion that is in contact with the contact surface and formed on or near a center of the spherical portion;
      a flat portion formed around the spherical portion; and
      a corner portion formed around the flat portion,
      wherein the spherical portion, the flat portion and the corner portion are configured to have a uniform thickness,
      wherein the spherical portion, the flat portion and the corner portion have flexibility in the pressing direction with the contact portion as a center.

2. An oscillatory wave motor according to claim 1, wherein a resonance frequency of deformation of the projecting portion by the flexibility is higher than a frequency of the AC voltage.

3. An oscillatory wave motor according to claim 2, wherein the resonance frequency of deformation of the projecting portion by the flexibility is twice or more to six times or less of the frequency of the AC voltage.

4. An oscillatory wave motor according to claim 1, wherein the projecting portion includes a spherical recessed portion that is spherically recessed on a side of the piezoelectric element of the spherical portion, and wherein an SR1, an SR2 and a D1 satisfy the following relation: SR1>SR2+D1, where the SR1 denotes a spherical radius of the spherical portion, the SR2 denotes a spherical radius of the spherical recessed portion and the D1 denotes a thickness of the spherical portion and the spherical recessed portion at the contact portion.

5. An oscillatory wave motor according to claim 1, wherein the projecting portion includes:
   a step portion between the contact portion and the flat portion; and
   a spherical recessed portion that is spherically recessed on a side of the piezoelectric portion of the contact portion,
   wherein an R1 and an R2 satisfy the following relation: R2<R1, where the R1 denotes a radius of the step portion with the contact portion as a center and the R2 denotes a radius at a place where the spherical recessed portion and the flat portion cross each other with the contact portion as the center.

6. An oscillatory wave motor according to claim 1, wherein the oscillator wave motor is an ultrasonic wave motor which causes the piezoelectric element and the elastic member to generate ultrasonic vibration.

* * * * *